Figure 1:
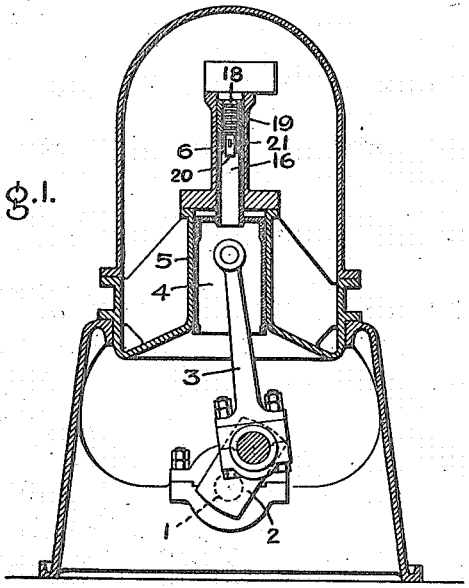

H. LEMP.
HIGH PRESSURE PISTON.
APPLICATION FILED JULY 21, 1914.

1,180,777.

Patented Apr. 25, 1916.

Witnesses:
Marcus L. Byng.
J. Ellis Glen

Inventor:
Hermann Lemp,
by: Albert Davis
His Attorney

UNITED STATES PATENT OFFICE.

HERMANN LEMP, OF ERIE, PENNSYLVANIA, ASSIGNOR TO GENERAL ELECTRIC COMPANY, A CORPORATION OF NEW YORK.

HIGH-PRESSURE PISTON.

1,180,777.

Specification of Letters Patent.　Patented Apr. 25, 1916.

Application filed July 21, 1914. Serial No. 852,326.

*To all whom it may concern:*

Be it known that I, HERMANN LEMP, a citizen of the United States, residing at Erie, in the county of Erie, State of Pennsylvania, have invented certain new and useful Improvements in High-Pressure Pistons, of which the following is a specification.

This invention relates to pistons for pumps and similar machines, and especially to those in which the piston works against heavy pressure. It is of especial advantage in the high pressure end of a reciprocating multistage air compressor, such for example as those used in connection with high compression internal combustion engines, to furnish the blast air for injecting the liquid fuel into the engine cylinder. This air is compressed to a pressure of from 900 to 1200 pounds to the square inch, so that great care must be exercised in packing the piston in the final stage of the pump. Owing to the small size of the piston, which is commonly from one and one-half to two inches in diameter, it is impracticable to use split packing rings sprung into grooves. Instead of this, the piston has a separable head provided at one end with a tenon secured in a socket in the end of the piston and having at its other end a flange to clamp a plurality of split spring packing rings and spacers lying between said flange and the end of the piston. It requires nice workmanship to fit these small pistons accurately and have them exactly co-axial with the low pressure pistons; both high and low pressure pistons being usually integral or fastened together, and their cylinders having their axes in line. If the clearances between the pistons and the cylinders are not made just right, there is danger of the pistons seizing and wrecking the pump in case the cooling water should fail; thereby involving costly delays and the expense of new machinery.

The object of the present invention is to minimize the possibility of such accidents, and to reduce the time necessary for repairs. With these ends in view, the invention comprises a solid piston fitting tightly in the cylinder and having a wearing surface of metal which is relatively soft with respect to the metal of which the cylinder is made. I prefer to use a core of steel having a thick sheath or jacket or bushing of the soft metal suitably secured thereto. The pressure of the compressed air on the end of the piston has a packing effect on the soft metal bushing, causing it to fit the cylinder tightly and to accommodate itself to any expansion or contraction. The soft metal I prefer to use is Babbitt metal, which has a melting point between 400 and 500 degrees Fahrenheit, depending upon the ingredients used and their proportions.

Figure 2:
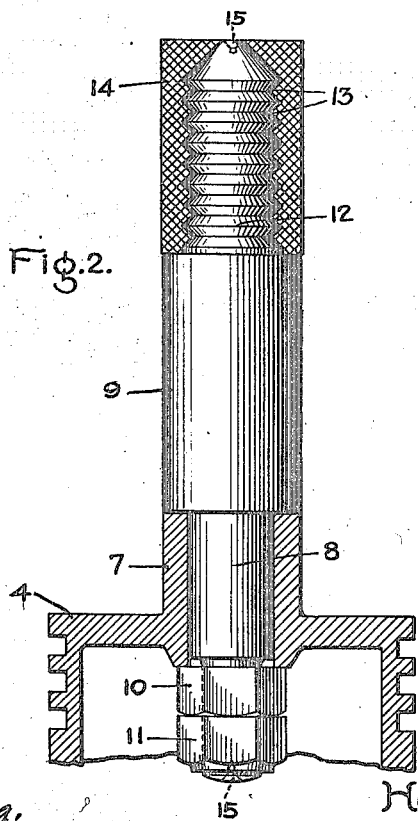

In the accompanying drawing, Figure 1 is a vertical section of a reciprocating two-stage air compressor embodying my invention. Fig. 2 is a sectional elevation of the preferred construction of the piston, on an enlarged scale, and Fig. 3 is a similar view of the modification shown in Fig. 1.

The compressor is of the usual construction, having a power-driven shaft 1 containing a crank 2 which is connected by a rod 3 with a trunk piston 4 working in a cylinder 5 and constituting the first or low pressure stage of the pump. Axially in line with the cylinder 5 is the high pressure cylinder 6, much smaller in diameter. Rising centrally from the head of the piston 4 is a neck 7 forming a socket to receive a tenon 8 on a solid piston 9 of steel. The tenon projects into the hollow trunk piston 4 and is screw-threaded to receive the fastening and lock nuts 10, 11. The outer portion 12 of the piston 9 is reduced in diameter and is given a rough or irregular surface, preferably a series of circumferential grooves 13. The upper end of the portion 12 is preferably conical, the inclination of the sides being preferably at about 45 degrees to the axis of the piston. This reduced portion 12 of the piston serves as a core for a head 14 of relatively soft metal, preferably babbitt, which is cast upon and around it, and is then turned down to the proper size by centering the steel piston in a lathe; the recess 15 for the lathe center being left for this purpose. The outside diameter of the Babbitt head is say three one-hundredths of an inch larger than the piston 9 so that it fits tightly in the cylinder. The heavy pressure of the hot compressed air forcing the soft metal against the conical tip of the core 12, causes said metal to expand and make close and air tight contact with the walls of the cylinder. Experience has proved the very satisfactory service which this device will render, and furthermore, that if by failure of the cooling water, the machine gets so hot as to melt the babbitt, the only damage done is to the piston head, which can be replaced, all repairs made, and the machine started up again, with not over one day's delay.

Figure 3:
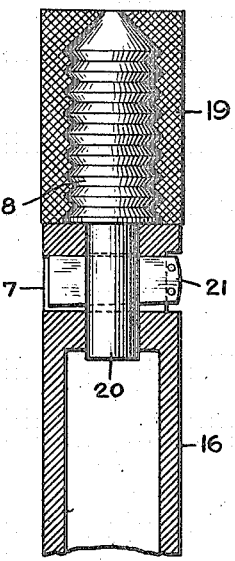

Figs. 1 and 3 show how my invention can be applied to many existing pumps. The body 16 of the piston is of about the combined length of the neck 7 and piston 9 shown in Fig. 2, and has a central socket intersected by a transverse slot 17. The piston head commonly used heretofore has a slotted tenon fitting said socket, in which it is fastened by a taper key. This is the construction outlined in the opening paragraphs of this specification. To adapt my invention to this structure, I make use of a grooved core 18 with a head of Babbitt metal 19 cast on it and a tenon 20 fitting the socket in the piston and having a transverse slot to register with the slot 17 in the piston and receive the fastening key 21.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. The combination with a cylinder, of a piston therein comprising a head having a core of hard metal and a bushing of soft metal, said bushing being adapted to fit closely the cylinder wall.

2. A piston head for a high pressure air pump, composed of a roughened hard metal core and a bushing of babbitt cast thereon.

3. The combination with the high pressure cylinder of a multistage air compressor, of a piston having a steel head faced with babbitt and tightly fitting said cylinder.

4. In a high pressure fluid pump, the combination of a cylinder, and a piston which moves therein, said piston having a head comprising a core of hard metal and a facing of softer metal, said facing of softer metal being adapted to be expanded on the hard metal by the pressure of the fluid being pumped so as to bring it into close contact with the cylinder wall.

5. A piston head having a grooved steel core provided with a conical tip, and a bushing of soft metal inclosing said core.

In witness whereof, I have hereunto set my hand this 18th day of July, 1914.

HERMANN LEMP.

Witnesses:
OTTO F. PERSSON,
O. T. FOUCHE.